United States Patent
Hsu et al.

(10) Patent No.: US 8,443,086 B2
(45) Date of Patent: May 14, 2013

(54) DECENTRALIZED STRUCTURED PEER-TO-PEER NETWORK AND LOAD BALANCING METHODS THEREOF

(75) Inventors: Chung-Yuan Hsu, Hsinchu (TW); Kuochen Wang, Hsinchu (TW); Hung-Cheng Shih, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 205 days.

(21) Appl. No.: 13/166,493

(22) Filed: Jun. 22, 2011

(65) Prior Publication Data
US 2012/0331146 A1  Dec. 27, 2012

(51) Int. Cl.
*G06F 15/173* (2006.01)
*G06F 15/16* (2006.01)
*G06F 7/00* (2006.01)

(52) U.S. Cl.
USPC ........... 709/226; 709/223; 709/224; 709/231; 707/622

(58) Field of Classification Search ................... 709/223, 709/226, 231; 707/622
See application file for complete search history.

(56) References Cited

U.S. PATENT DOCUMENTS

| 5,479,511 | A * | 12/1995 | Naccache | 380/28 |
| 7,593,333 | B2 | 9/2009 | Li et al. | |
| 7,613,796 | B2 | 11/2009 | Harvey et al. | |
| 7,792,915 | B2 | 9/2010 | Berkey et al. | |
| 8,380,868 | B2 * | 2/2013 | Hiie | 709/231 |
| 2002/0107735 | A1 * | 8/2002 | Henkin et al. | 705/14 |
| 2003/0196060 | A1 * | 10/2003 | Miller | 711/170 |
| 2005/0091167 | A1 * | 4/2005 | Moore et al. | 705/57 |
| 2006/0236370 | A1 * | 10/2006 | John et al. | 726/1 |
| 2008/0298579 | A1 * | 12/2008 | Abu-Amara | 380/30 |
| 2008/0310302 | A1 * | 12/2008 | Detwiler et al. | 370/230 |
| 2009/0204964 | A1 * | 8/2009 | Foley et al. | 718/1 |
| 2010/0039931 | A1 * | 2/2010 | Shi et al. | 370/216 |

(Continued)

FOREIGN PATENT DOCUMENTS

| EP | 1 926 276 A1 | 5/2008 |
| EP | 2 171 607 A1 | 4/2010 |

(Continued)

OTHER PUBLICATIONS

Y. Mu et al., "Dynamic load balancing with multiple hash functions in structured P2P system," in Proceeding of the $5^{th}$ International Conference on Wireless Communications, Networking and Mobile Computing, Oct. 2009, 4 pages.

(Continued)

*Primary Examiner* — Hua Fan
*Assistant Examiner* — Joe Chacko
(74) *Attorney, Agent, or Firm* — Muncy, Geissler, Olds & Lowe, PLLC

(57) ABSTRACT

An approach is provided for reassigning and sharing loads to peers with a same identity, which is based on a threshold. The peers are configured to store indexes of a key and to share the same loading (i.e., indexes) of the key to the peers with same secondary identities in different zones. The secondary identity is derived and has a modulo relationship with a first identity of the peer. The threshold indicates maximum number of indexes stored in each peer. Therefore, the loading are distributed evenly to peers in different zones, which achieves load balance to a decentralized structured peer-to-peer network.

5 Claims, 4 Drawing Sheets

U.S. PATENT DOCUMENTS

| | | | |
|---|---|---|---|
| 2010/0153578 A1* | 6/2010 | Van Gassel et al. | 709/231 |
| 2011/0099262 A1* | 4/2011 | Wang | 709/223 |
| 2011/0153634 A1* | 6/2011 | Chu et al. | 707/764 |
| 2011/0202652 A1* | 8/2011 | Memon et al. | 709/224 |
| 2012/0331143 A1* | 12/2012 | Niebergall et al. | 709/226 |

FOREIGN PATENT DOCUMENTS

| | | |
|---|---|---|
| EP | 2 211 525 A1 | 7/2010 |
| TW | I271957 | 1/2007 |
| TW | I327036 | 7/2010 |
| TW | I330022 | 9/2010 |
| TW | I332780 | 11/2010 |
| WO | WO 2008/157416 | 12/2008 |

OTHER PUBLICATIONS

M. Steiner et al., "Load reduction in the KAD peer-to-peer system," in Proceedings of the 5$^{th}$ International Workshop on Databases, Information Systems and Peer-to-Peer Computing, Oct. 2007, 11 pages.

P. Maymounkov et al., "Kademlia: A peer-to-peer information system based on the XOR metric," in Proceedings of the 1$^{st}$ International Workshop on Peer-to-Peer Systems (IPTPS), Mar. 2002, pp. 53-65.

Chung-Yuan Hsu "An Efficient Decentralized Load Balancing Scheme in KAD Peer-to-Peer Networks" an Oral defense in National Chiao Tung University in Partial Fulfillment of the Requirements for the Degree of Master in Computer Science, Jun. 2010, 44 pages.

* cited by examiner

DECENTRALIZED STRUCTURED PEER-TO-PEER NETWORK AND LOAD BALANCING METHODS THEREOF

FIELD OF THE INVENTION

Embodiments of the invention relate to a structured peer-to-peer network, and especially to a decentralized structured peer-to-peer network and methods in response to the loading condition of the structured peer-to-peer network.

BACKGROUND

The peer-to-peer (P2P) application is one of the most important applications, which provides file sharing, storage and communication services over the network. In general, there are three main types of P2P networks: unstructured P2P, hybrid P2P and structured P2P. Furthermore, the structured P2P network is most popular one due to its outstanding performance of data discovery.

In the typical structured P2P network system, each data object is mapped to and stored in a specific peer with a unique identity (ID). Structured P2P network could result in an O(log N) imbalance factor in some objects stored in a target peer, when implemented by using a lookup procedure method for finding target peer. Some hotspots (i.e., heavy loading peers) in the network may cause network congestion, low routing performance and insufficient search hit rate. For example, when stored keywords are popular, the target peer handles large amount of indexes. It may cause unbalanced loads between peers. Moreover, the search hit rate decreases dramatically when hotspots become offline.

One of the most popular structured P2P network, namely Kademlia (KAD) structured P2P network, has its own load balancing strategy. The conventional KAD structured P2P network limits the number of indexes in each peer to avoid overloading. A peer can handle a maximum of 60,000 indexes and hold a maximum of 50,000 indexes of an individual keyword. Therefore, when a peer receives a publishing request while reaching the limit of maximum indexes, it will reply a successful message, even if the publishing request is rejected.

Therefore, there is a need for an approach to provide a new scheme and load balancing method that can adapt to the loading conditions of a structured P2P network and operate within existing protocols.

Some Exemplary Embodiments

These and other needs are addressed by the invention, wherein an approach is provided for reassigning and sharing loads to peers with same identities (i.e., modulo identities), which is based on a threshold (i.e., a request forwarding threshold (RFT)) corresponding to the loading condition of a structured peer-to-peer (P2P) network.

Another approach is provided for improving hit rate of keyword search without complex calculations.

According to one aspect of an embodiment of the present invention, a decentralized structured P2P network comprises a plurality of peers arranged in a plurality of zones. Each peer has a unique identity (ID), a modulo identity (mod ID) and a threshold. The peers are configured to store indexes of a key and share the same key to the peers with same mod ID in other zones. The threshold indicates maximum number of indexes stored in each peer. The mod ID of the peer is derived from a modulo relationship of the unique ID and the number of peers in the zone.

According to another aspect of an embodiment of the present invention, a load balancing method is provided for publishing a key to a target peer in a structured P2P network. The structured P2P network has a plurality of peers having at least a mod ID and a threshold, and the load balancing method comprises actions of receiving a request message from a sender peer, assigning a reassigned peer as a new target peer when the target peer excesses the threshold, and recording number of times of assigning a new target peer to a counter. The threshold indicates maximum number of indexes stored in each peer, and the reassigned peers are configured to have a same mod ID of the target peer in other zones.

According to yet another aspect of an embodiment of the present invention, a load balancing method for searching a key of a search peer in a structured P2P network. The structured P2P network has indexes of the key shared sequentially among peers in different zones, each peer sharing the same key having a same modulo identity and a counter value, and the loading balancing method comprises actions of hashing a keyword to get the key, wherein the keyword is obtained from a query of the search peer, finding a target peer based on the key, obtaining the counter value from the target peer, determining the shared peers in the zones according to the counter and the mod ID, sending a search message to the peers and receiving answers from the peers shared the same key.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative, and not as restrictive.

BRIEF DESCRIPTION OF THE DRAWINGS

The invention is illustrated by way of example, which is not intended for limitations, in the figures of the accompanying drawings in which like reference numerals refer to similar elements and in which.

DESCRIPTION OF THE PREFERRED EMBODIMENT

A decentralized scheme and load balancing method for publishing and search in a structured peer-to-peer (P2P) network are disclosed. In the following descriptions, for the purposes of explanation, numerous specific details are set forth in order to provide a thorough understanding of the invention. It is apparent, however, to one skilled in the art that the invention may be practiced without these specific details or with an equivalent arrangement. In other instances, wellknown structures and devices are shown in block diagram form in order to avoid unnecessarily obscuring the essence of the invention.

Although the invention, according to various embodiments, is discussed with respect to a Kademlia (KAD) structured P2P network (such as a P2P file sharing network), it is recognized by one of ordinary skill in the art that the embodiments of the invention are applicable to any type of Distributed Hush Table (DHT) structured P2P network. Additionally, the various embodiments of the invention are explained using a Request Forwarding Threshold (RFT), it is recognized by one of ordinary skill in the art that other indicia of loading condition can be utilized.

Figure 1:
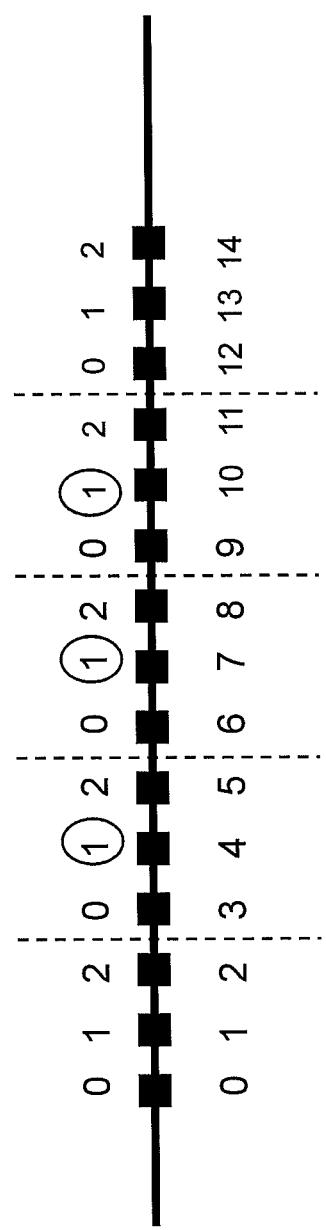
FIG. 1 is a diagram of a mapping between original identities (IDs) and modulo identities (mod IDs) for peers in a decentralized P2P network, in accordance with an embodiment of the invention.

Refer to FIG. 1, FIG. 1 is a diagram of a mapping between original identities (IDs) and modulo identities (mod IDs) for peers in a decentralized P2P network, in accordance with an embodiment of the invention. For the purpose of describing the invention more clearly, FIG. 1 utilizes simplified numbers of peers and zones.

A decentralized computing environment may be defined by a number of computing systems interconnected to communicate with one another, wherein each computing system can perform both client and server. A decentralized structured P2P network represents a decentralized computing environment within a P2P network is defined as a peer of every computing system in a network. Additionally, each peer may be configured to execute software having substantially equivalent functionality, such as data transmission.

A decentralized structured P2P network in accordance with the present invention comprises a plurality of peers arranged in a plurality of zones. Each peer has a uniquely original identity (ID), a modulo identity (mod ID) and a threshold. The peers are configured to store indexes of a key and to share the same key to the peers with same mod ID in other zones. The threshold indicates maximum number of indexes stored in each peer. The mod ID of the peer is derived from a modulo relationship of the uniquely original ID and the number of peers in the zone.

For example, an existing protocol of a KAD structured P2P network has a 128-bit identity space and 256 zones (known as Tolerance zone). Each zone has at most $2^{120}$ peers that is divided into $2^{128}$ by 256, and thus each zone has same amount (i.e. $2^{120}$) of peers. Each peer has a uniquely original identity (ID), namely a KAD ID. According to an embodiment of the present invention, the peer further comprises a threshold and a modulo identity (mod ID). The peers in the KAD structured P2P network are configured to store indexes of a key and share the same key to the peers with same mod ID in other zones. Every $2^{120}$ peers have the same mod ID.

The threshold indicates maximum indexes stored in the peer, and may be a value of Request Forwarding Threshold (RFT). The threshold is determined by using lowest Gini Coefficient (G). The actions of obtaining the lowest G is obtained from making pre-simulation based on the number of indexes handled by peers in the structured P2P network. It is recognized by one of ordinary skill in the art that the range of G is between 0 and 1, and the lower the G is, the more load balancing it is. The calculation of G has the following relationship:

$$G = \frac{1}{2\mu} \cdot \frac{1}{N^2} \sum_{i=1}^{N} \sum_{j=1}^{N} |l_i - l_j|;$$

wherein, N is number of zones in the structured P2P network, $l_i$, and $l_j$ are the number of keys handled by the $i^{th}$ and $j^{th}$ zones, and $\mu$ is the average number of keys handled by each zone.

The mod ID of the peer is derived from a modulo relationship of the uniquely original ID and the number of peers in the zone. The derivation of the mod ID with following modulo relationship:

a≡b mod n;

wherein a is the original ID, b is the mod ID and n is the number of peers in each zone.

Accordingly, as shown in FIG. 1, A decentralized structured P2P network has, not limited to 15 peers from 0 to 14 (original IDs) distributed sequentially in 5 zones (3 peers in a zone). For example, when 4≡1 mod 3, "1" is the mod ID corresponds to the original ID of "4", and "3" is the number of peers in each zone. Table 1 below, enumerates the relations between original IDs and mod IDs in the structured P2P network in accordance with the present invention.

TABLE 1

| Original IDs | Mod IDs | Zones |
|---|---|---|
| 0 | 0 | 1 |
| 1 | 1 | |
| 2 | 2 | |
| 3 | 0 | 2 |
| 4 | 1 | |
| 5 | 2 | |
| 6 | 0 | 3 |
| 7 | 1 | |
| 8 | 2 | |
| 9 | 0 | 4 |
| 10 | 1 | |
| 11 | 2 | |
| 12 | 0 | 5 |
| 13 | 1 | |
| 14 | 2 | |

In this manner, assuming 90 indexes of a key are going to publish at a target peer, and threshold is set to 30. Due to the limitation of the threshold, the target peer will only handle the first 30 indexes. The remaining $31^{st}$ to $90^{th}$ indexes will be reassigned to be published at peers 7 and 10 (original IDs) respectively because of the same mod ID of the peer 4. Therefore, peers in different zones of the structured P2P network are able to share the loading of the key.

Figure 2A:
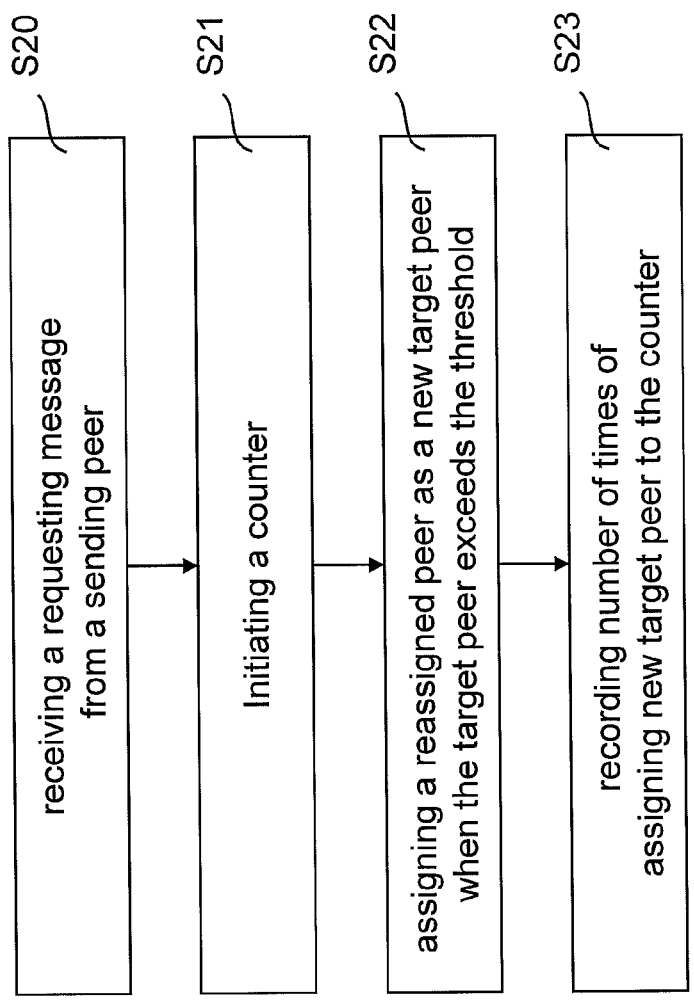
FIG. 2A is a flowchart of an embodiment of the present invention when the received indexes of the target peer excess the threshold.
Figure 2B:
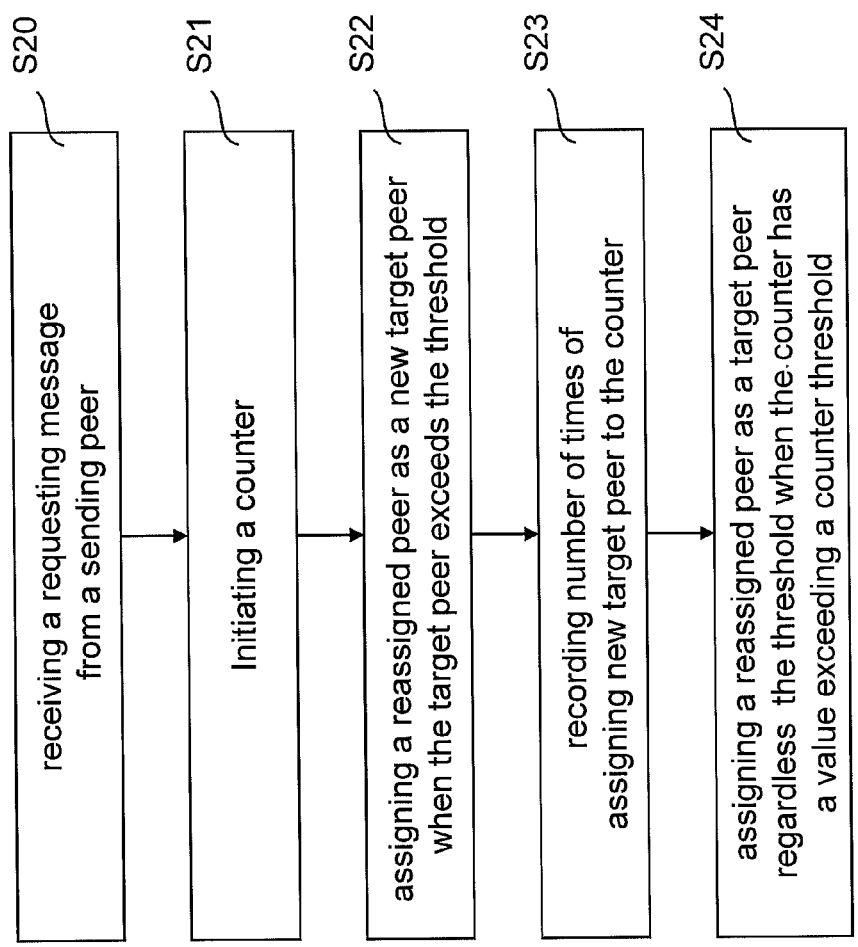
FIG. 2B is a flowchart of an embodiment of the present invention when the times of reassigning new target peer excess the numbers of zones in the structured P2P network.

Refer to FIGS. 2A and 2B, FIG. 2A is a flowchart of an embodiment of the present invention when the received indexes of the target peer excess the threshold. FIG. 2B is a flowchart of an embodiment of the present invention when the times of reassigning new target peer excesses the numbers of zones in the structured P2P network.

Publish is an essential action in the structured P2P network for peers want to share objects. For a KAD structured P2P network, when a sending peer wants to publish a key, the sending peer first hashes the key into series of indexes, uses a lookup procedure method to find the target peer and sends a requesting message (KAD_REQ) to the target peer for storing the key. The target peer then responds an acknowledge message (KAD_RES) back to the sending peer. After receiving the KAD_RES, the sending peer sends a publishing message (KAD_publish_REQ) to the target peer until the sending peer receives a received message (KAD_publish_RES). The key is then marked as successfully published.

According to an embodiment of the present invention, the structured P2P network has a plurality of peers in zones, and each peer has at least a mod ID and a threshold. The load balancing method for publishing a key to the target peer in the structured P2P network, as shown in FIG. 2A, comprises actions S20 of receiving a requesting message from a sending peer, S21 of initiating a counter, S22 of assigning a reassigned peer as a new target peer when the target peer excesses the threshold and S23 recording number of times of assigning a new target peer to the counter. The reassigned peers are configured to have a same mod ID of the target peer at other zones in the structured P2P network.

For example, the KAD structured P2P network, as mentioned before, has a 128-bit identity space, 256 zones, and each zone has $2^{120}$ peers. When the sending peer (or sending peers) wants to publish 180 indexes of a key to the target peer N (i.e., the peer which KAD ID=N) and the threshold has been set to 60. The sending peer sends a KAD_REQ to the target peer. Firstly, the target peer N will check if it has ever received the same KAD_REQ. if the target peer N has not received the request previously, it initializes a new counter, otherwise, it adds one to the counter. Secondly, the target peer N receives at most of first $60^{th}$ indexes until that exceeds its threshold, and becomes a redirection peer that assigns a reassigned peer as a new target peer. Then, repeating redirections until all the keys have been published. In this example, the $61^{st}$ to $120^{th}$ indexes will redirect to the peer $(N+1\times2^{120})$ in an adjacent zone to the peer N as a new target peer, and the $121^{st}$ to $180^{th}$ indexes will redirect to the peer $(N+2\times2^{120})$ in an adjacent zone to the peer $(N+1\times2^{120})$ as a new target peer. Accordingly, the counter has a value 3 that means the target peer has been reassigned 2 times. The peer N, $(N+1\times2^{120})$ and $(N+2\times2^{120})$ shares the loading of the same key.

In order to avoid an infinite loop of redirecting a new target peer between zones in the structured P2P network. As shown in FIG. 2B, the publishing method for the target peer in the structure P2P network further comprises actions of S24 assigning a reassigned peer as a target peer regardless the threshold when the counter has a value exceeding a counter threshold. The counter threshold corresponds to the number of zones in the structured P2P network. In an example, the counter threshold has been set to 255 because there are 256 zones in a KAD structured P2P network. In other words, the method forces the peer $(N+255\times2^{120})$ to accept all the indexes of the key regardless the threshold.

Figure 3:
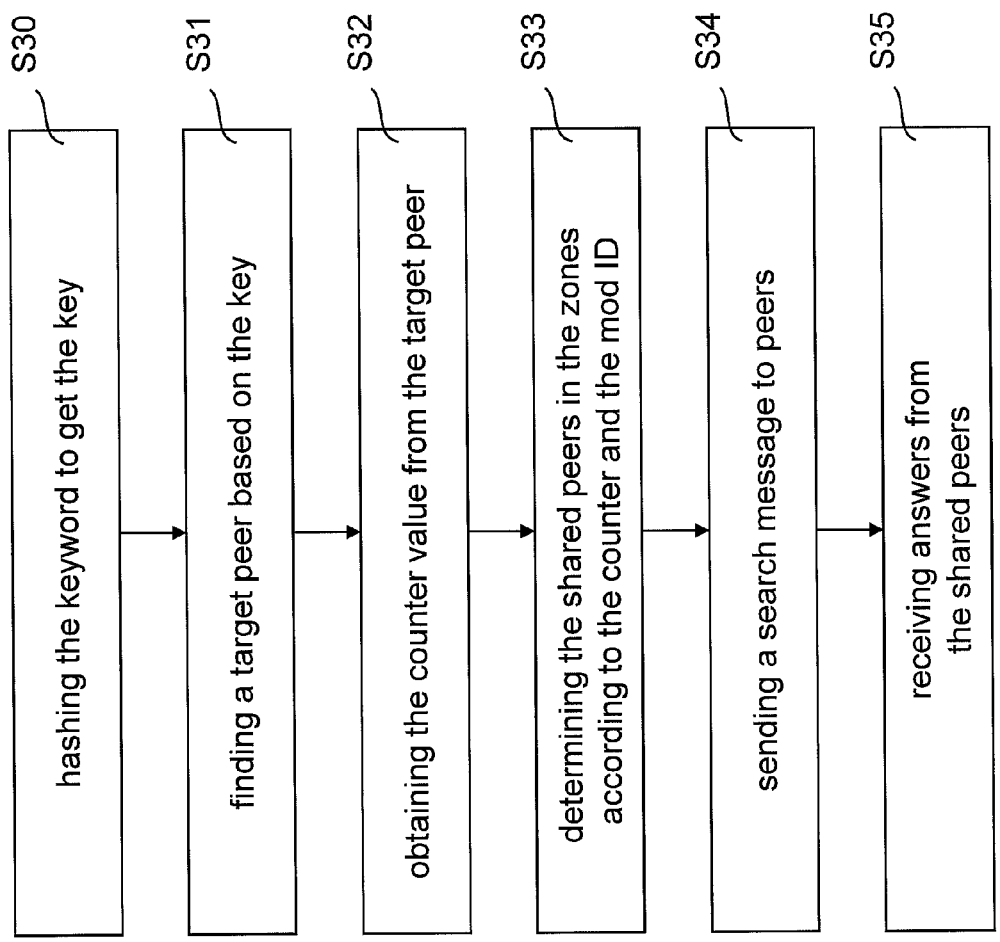
FIG. 3 is a flowchart of an embodiment of the present invention for a search procedure in the structured P2P network.

With reference to FIG. 3, FIG. 3 is a flowchart of an embodiment of the present invention for a search procedure in the structured P2P network. The structured P2P network has indexes of a key shared sequentially among peers in different zones. Each peer sharing the same key has a same mod ID and a counter value. The counter value indicates the number of zones that have been stored indexes of the same key. However, when a search peer wants to search for an object, a searching peer needs to know all the peers after obtaining a keyword from a query.

According to an embodiment of the present invention, A load balancing method for searching a key of a search peer in the structured P2P network comprises actions S30 of hashing the keyword to get the key, S31 of finding a target peer based on the key, S32 of obtaining the counter value from the target peer, S33 of determining the shared peers in the zones according to the counter and the mod ID, S34 of sending a search message to peers, and S35 of receiving answers from the shared peers. The action S31 of finding a target peer uses a lookup procedure method to find the target peer.

Since the indexes of the key are shared sequentially among peers having same mod ID in difference zones, the shared peers can be determined easily by knowing the counter value. For example, as mentioned above, a typical KAD structured P2P network has a 128-bit identity space, 256 zones, and each zone has $2^{120}$ peers. The mod ID for each peer has modulo relationship of the KAD ID and the number of peers in the zone. When $N^{th}$ peer is found as a target peer and the counter value is 4, the N, $(N+1\times2^{120})$, $(N+2\times2^{120})$ and $(N+3\times2^{120})$ peers are determined and known as the shared peers. The shared peers share the indexes of the same key. Therefore, as the overloading indexes of each key have been evenly distributed among peers, the search method in accordance with the present invention not only improves the search flexibility without the need of complex calculations, but also improves the hit rate of keyword searching.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A decentralized structured peer-to-peer network, comprising a plurality of peers arranged in a plurality of zones, and each peer having a uniquely original identity, a modulo identity and a threshold, wherein the peers are configured to store indexes of a key and to share the same key to the peers with same modulo identity in other zones, the threshold indicates maximum number of indexes stored in each peer, and the modulo identity of each peer is derived from a modulo relationship of the original identity and the number of peers in the zone wherein a≡b mod n, where a is the original identity, b is the modulo identity and n is the number of peers in each zone.

2. The decentralized structured peer-to-peer network as claimed in claim 1, wherein the threshold is determined by using lowest Gini Coefficient.

3. The decentralized structured peer-to-peer network as claimed in claim 2, wherein the threshold is a request forwarding threshold.

4. The decentralized structured peer-to-peer network as claimed in claim 2, wherein calculation of Gini Coefficient (G) has a relationship of $$G = \frac{1}{2\mu} \cdot \frac{1}{N^2} \sum_{i=1}^{N} \sum_{j=1}^{N} |l_i - l_j|,$$

wherein N is number of zones, $l_i$, and $l_j$ are number of keys handled by the $i^{th}$ and $j^{th}$ zones, and μ is average number of keys handled by each zone.

5. The decentralized structured peer-to-peer network as claimed in claim 1, wherein the decentralized structured peer-to-peer network is a Kademlia structured peer-to-peer network comprising a 128-bit identity space, 256 zones, and $2^{120}$ peers respectively in each zones, wherein every $2^{120}$ peer among zones has the same modulo identity.

* * * * *